(12) United States Patent
Lillis et al.

(10) Patent No.: US 12,078,255 B2
(45) Date of Patent: Sep. 3, 2024

(54) ACTUATOR

(71) Applicant: Osler Diagnostics Limited, Oxford (GB)

(72) Inventors: Barry Lillis, London (GB); Steven Green, Oxford (GB); Damian Holland, Witney (GB)

(73) Assignee: Osler Diagnostics Limited, Oxford (GB)

( * ) Notice: Subject to any disclaimer, the term of this patent is extended or adjusted under 35 U.S.C. 154(b) by 63 days.

(21) Appl. No.: 17/916,004

(22) PCT Filed: Mar. 30, 2021

(86) PCT No.: PCT/EP2021/058364
§ 371 (c)(1),
(2) Date: Sep. 29, 2022

(87) PCT Pub. No.: WO2021/198297
PCT Pub. Date: Oct. 7, 2021

(65) Prior Publication Data
US 2023/0147534 A1 May 11, 2023

(30) Foreign Application Priority Data
Mar. 31, 2020 (GB) .................................... 2004720

(51) Int. Cl.
*F16K 11/16* (2006.01)
*B01L 3/00* (2006.01)
(Continued)

(52) U.S. Cl.
CPC ...... *F16K 11/165* (2013.01); *B01L 3/502715* (2013.01); *B01L 3/502738* (2013.01);
(Continued)

(58) Field of Classification Search
CPC ....... B01L 2300/0887; B01L 2200/025; B01L 2400/0655; B01L 3/502738;
(Continued)

(56) References Cited

U.S. PATENT DOCUMENTS 1,280,616 A * 10/1918 Lawler .................. F16K 11/165
  137/630.16
1,997,977 A * 4/1935 Petersen ............... F16K 31/524
  251/299

(Continued)

FOREIGN PATENT DOCUMENTS

DE    10 2017 121205 A1   3/2019
GB       2 560 734 A       9/2018
(Continued)

OTHER PUBLICATIONS

International Search Report for International Application No. PCT/EP2021/058364 dated Jun. 24, 2021.

*Primary Examiner* — Jessica Cahill
(74) *Attorney, Agent, or Firm* — KNOBBE, MARTENS, OLSON & BEAR, LLP (57) ABSTRACT

The present disclosure relates to an actuator, an actuator assembly, a method of operating an actuator, a computer program and a system. In one aspect, an actuator may comprise a plurality of independently operable actuation elements and an operator having an operator surface. Each actuation element may have an actuation surface. The operator may be driveable to move the operator surface along a path to selectively engage with the respective actuation surface of each actuation element to actuate the actuation element.

19 Claims, 9 Drawing Sheets

(51) Int. Cl.
*F16K 31/524* (2006.01)
*F16K 99/00* (2006.01)

(52) U.S. Cl.
CPC .... *F16K 31/52491* (2013.01); *F16K 99/0026* (2013.01); *F16K 99/0028* (2013.01); *F16K 99/0042* (2013.01); *B01L 2200/025* (2013.01); *B01L 2300/0887* (2013.01); *B01L 2400/0655* (2013.01)

(58) Field of Classification Search
CPC ............. B01L 3/502715; F16K 11/165; F16K 31/52491; F16K 31/524; F16K 99/0042; F16K 99/0028; F16K 99/0026
See application file for complete search history.

(56) References Cited

U.S. PATENT DOCUMENTS

| | | | | |
|---|---|---|---|---|
| 3,023,778 | A * | 3/1962 | Hayes | B23Q 35/36 91/47 |
| 3,578,217 | A * | 5/1971 | Miller | B65B 3/323 426/414 |
| 4,684,040 | A * | 8/1987 | Jonovic | G01F 11/024 222/218 |
| 8,911,688 | B2 * | 12/2014 | Gransee | F16K 99/0001 422/243 |
| 9,957,553 | B2 * | 5/2018 | Kayyem | B01L 3/502738 |
| 2003/0150495 | A1 * | 8/2003 | Hara | F16K 31/047 137/597 |
| 2015/0308578 | A1 * | 10/2015 | Block, III | C12M 21/08 137/625.48 |

FOREIGN PATENT DOCUMENTS

WO    WO 2008/018036 A2    2/2008
WO    WO 2014/066704 A1    5/2014

* cited by examiner

Engaging direction ➡

FIGURE 3B

⬅ Non-engaging direction

ACTUATOR

The present disclosure relates to an actuator, an actuator assembly, a method of operating an actuator, a computer program and a system.

BACKGROUND

Low volume liquid handling devices, such as microfluidic devices, require the precise control and manipulation of fluids through an array of channels. Conventional passive control may limit the complexity and number of operations achievable in a liquid handling device. As such, passive control may be unsuited to liquid handling devices for performing advanced diagnostic tests, such as immunoassays which may require mixing of multiple solutions and reagents, with precise control of volumes and mixing times.

Active control of flow through channels by actively opening and closing valves with an external actuator greatly broadens the range of operations possible. However, liquid handling devices and systems with active control are generally larger and more expensive than their passively controlled counter parts, since they require an external actuator.

Further, there is a current trend towards providing point-of-care health testing services, which bring a diagnostic test conveniently and immediately to a patient, allowing better and faster clinical decisions to be made. However, point-of-care devices and systems must be kept portable and affordable if they are to be successfully deployed.

Thus, there is a need to provide compact, reliable and low cost actuators that are suitable for complex control of multiple valves in a liquid handling device.

SUMMARY

This summary introduces concepts that are described in more detail in the detailed description. It should not be used to identify essential features of the claimed subject matter, nor to limit the scope of the claimed subject matter.

In one aspect, an actuator may comprise a plurality of independently operable actuation elements and an operator having an operator surface. Each actuation element may have an actuation surface. The operator may be driveable to move the operator surface along a path to selectively engage with the respective actuation surface of each actuation element to actuate the actuation element.

This actuator design is simple, reliable and compact, while still enabling complex independent control of a plurality of actuation elements.

The actuation elements may be arranged or mounted in an actuation element rack. The actuator may be a valve actuator and the actuation elements may be for actuating a corresponding plurality of valves. For example, such a valve actuator may be for a system, such as a diagnostic system, for receiving a liquid handling device comprising the corresponding plurality of valves.

The actuator may be configured such that the operator surface cannot engage with the actuation surfaces of the actuation elements as the operator surface moves along the path in one direction, and such that the operator surface can engage with the actuation surfaces of the actuation elements as the operator surface moves along the path in the opposite direction (i.e. opposite to the one direction).

In this instance, the one direction may be referred to as a non-engaging direction and the opposite direction may be referred to as an engaging direction. As the operator surface moves in an engaging direction, it may engage an actuation surface and actuate the respective actuation element. Conversely, as the operator surface moves in a non-engaging direction, it may not engage an actuation surface and not actuate the respective actuation element.

The path may be a closed loop, such as an ellipse or circle or any other closed curve, regular or irregular. An advantage of a closed loop path is that it may provide a more compact actuator for a given number of actuation elements. An actuator with a closed loop path, and in particular a circular path, may also be driven by a simple driving means, such as an electric motor, without the need for a complex driving mechanism.

The plurality of actuation elements may comprise three or more actuation elements. The total number of actuation elements is essentially unlimited, meaning that a single actuator can be adapted to provide as many actuation elements as required for a given purpose.

The operator may be configured to operate only one actuation element of the plurality of actuation elements at any one time, providing precise control of the actuation elements.

The operator may be driveable to move the operator surface along the path to selectively engage with the respective actuation surface of each actuation element to actuate the actuation element to a selectively controlled degree, further increasing control.

Each actuation element may be biased to an activated position when not engaged with the operator surface, wherein each actuation element assumes an at least partially deactivated position when the operator surface engages with the respective actuation surface of each actuation element. This allows the actuator to set valves to be closed by default, as may be preferable in a liquid handling device.

As such, each actuation element may be biased by an actuation element spring element. The actuation element spring elements may be mounted in the actuation element rack.

Each actuation surface may be a ramp, wherein an extent of actuation of each actuation element changes as the operator surface moves along the path and selectively engages with the ramp of each actuation element.

Each ramp may be configured so that the operator surface is able to engage with the ramp when it moves along the path from one direction only.

Each ramp may comprise a backstop, wherein the backstop is configured to prevent the operator surface from disengaging the ramp. As such the backstop may be at or towards a top end of the ramp (i.e. the end opposite the end at which the operator is configured to enter the ramp). A backstop may prevent the operator from accidentally disengaging an actuation element, increasing the reliability of the actuator.

The actuator may further comprise an operator support for supporting the operator, the operator support comprising a stopper pin. The operator is configured to rotate about a point on the operator support when the operator surface moves along the path in the one direction (the non-engaging direction) and the operator contacts one of the actuation elements, such that the operator passes the respective actuation element without the operator surface engaging the actuation surface of the respective actuation element.

The stopper pin is configured to prevent rotation of the operator when the operator surface moves along the path in the opposite direction (the engaging direction) and contacts an actuation element.

This bypass mechanism allows the operator to be moved from one actuation element to another without needing to actuate any intervening actuation elements, greatly improving the functionality of the actuator.

The actuator may further comprise a spring element configured to bias the operator against the stopper pin. The spring element may be a spring, such as a torsion spring or any other appropriate spring. A spring recess may be provided in the surface of the operator support for receiving the spring element. A biasing pin may couple the spring element and operator via an operator-spring pin hole in the operator.

When the path along which the operator surface is moved is circular, the operator support may be configured to rotate, and a central point of the circular path may coincide with a rotation axis of the operator support. As such, the operator support may be readily driven using a simple driving means, such as a motor, without the need for a complex driving mechanism.

In another aspect, an actuator assembly may comprise an actuator as described above and a driving means for driving the operator of the actuator. The actuation elements of the actuator may be arranged linearly, or in a circle, or in any other way.

The driving means may be a stepped drive motor, optionally with more than 100 or 1000 positions. The driving means may be operable to selectively drive the operator to selectively position the operator surface on the path to selectively actuate one of the actuation elements.

The driving means may be connected to the operator support described above, optionally via gears, such as an input gear and an output gear. At least one of a driving means, an actuation element rack of the actuator, an input gear and an output gear may be mounted to a base plate. When the actuation elements are linearly arranged, the driving means may drive the operator via a rack-and-pinion.

In another aspect, a method of operating an actuator as described above may comprise driving the operator to move the operator surface along the path to selectively engage with the respective actuation surface of one of the actuation elements to actuate the actuation element.

The method may further comprise selecting one of the plurality of actuation elements; moving the operator surface along the path in one direction (the non-engaging direction) past the selected actuation element; and moving the operator surface along the path in an opposite direction (the engaging direction) to engage with the respective actuation surface of the selected actuation element.

This method moves the operator to any of the actuation elements without needing to actuate any of the other actuation elements along the way, greatly improving the functionality of the actuator.

In another aspect, a computer program may comprise computer-executable instructions which, when executed by a system, cause the system to perform one or more of the methods described above.

In another aspect, a system may comprise the actuator assembly described above and/or a processor configured to execute the computer program described above.

The processor controls the driving means of the actuator assembly. The system may further comprise additional components such as a power supply and/or processor-driving means interface in order to control the driving means.

The system may be configured to receive a diagnostic device such as a liquid handling device comprising a plurality of valves, wherein the actuator assembly is a valve actuator and the actuation elements of the actuator are for actuating the plurality of valves.

BRIEF DESCRIPTION OF THE DRAWINGS

Embodiments of the present invention will now be described, by way of example only, with reference to the accompanying drawings, in which.

DETAILED DESCRIPTION

Figure 1:
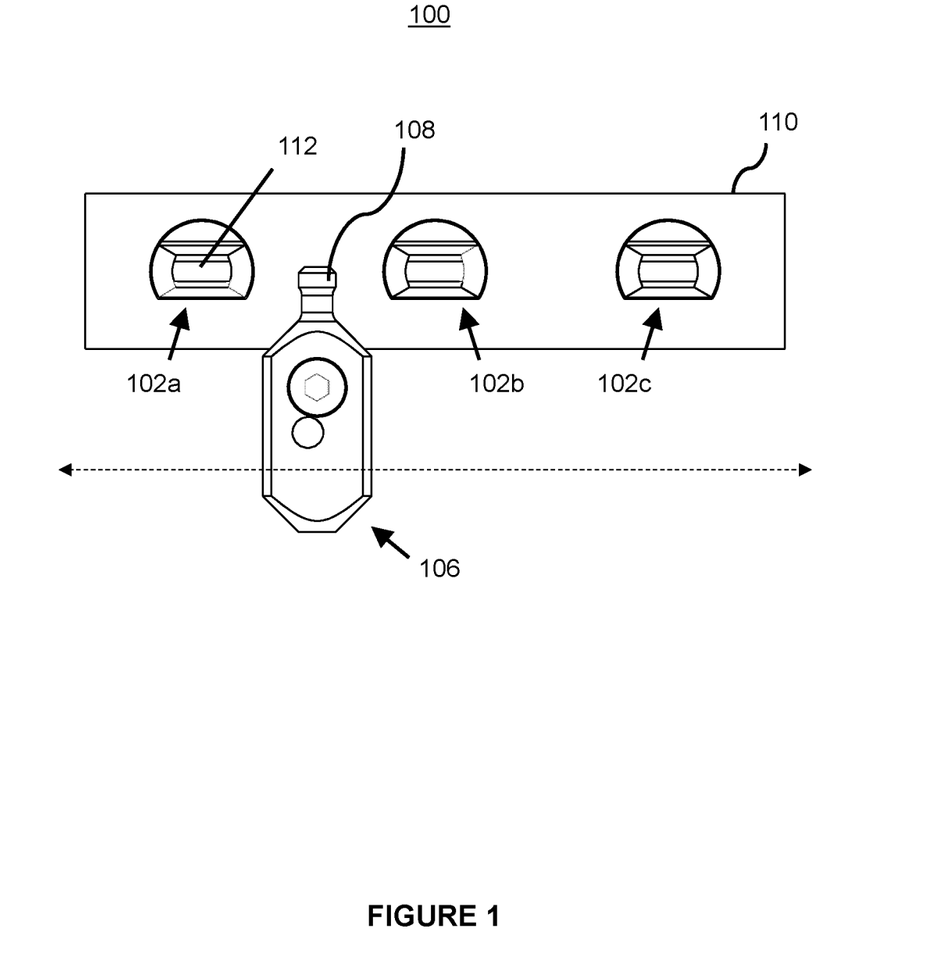
FIG. 1 illustrates an actuator with a linear array of actuation elements.
Figure 2A:
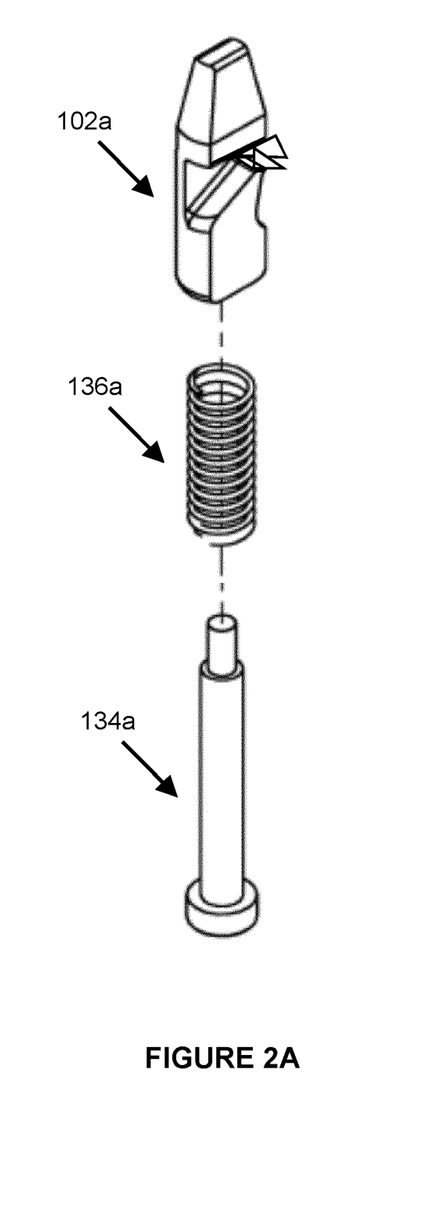
FIGS. 2A and 2B illustrate an actuation element.
Figure 2B:
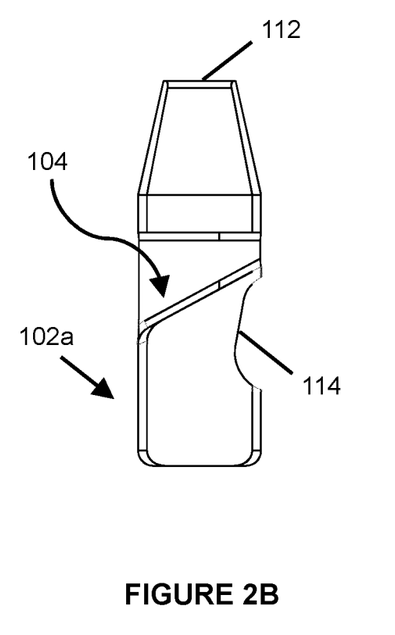

With reference to FIG. 1, a first example actuator 100 comprises a plurality of independently operable actuation elements 102a-102c. The actuator 100 in FIG. 1 comprises three actuation elements 102a-102c, but may comprise more or may only comprise two. Each actuation element has an actuation surface 104 as illustrated in FIGS. 2A and 2B.

Also illustrated in FIG. 1 is an operator 106 having an operator surface 108. The operator 106 is driveable to move the operator surface 108 along a path to selectively engage with the respective actuation surface 104 of each actuation element 102a-102c to actuate the actuation element. The operator 106 is configured to operate only one actuation element 102a-102c at any one time.

The actuation elements 102a-102c illustrated in FIG. 1 are arranged linearly in an actuation element rack 110. As such, the path along which the operator surface 108 moves is also linear. The operator 106 may be driven backwards and forwards along the linear path using a motor and a rack-and-pinion connected to the operator 106, or any other suitable means, as would be understood by the skilled person.

The actuator 100 illustrated in FIG. 1 is a valve actuator, meaning the actuation elements 102a-102c are for actuating a corresponding plurality of valves. For example, a plurality of valves may be pinch valves, and an end effector 112 of each actuation element 102a-102c may be used to open and close the pinch valves. Such a valve actuator may, for example, be for a system for receiving a liquid handling device comprising the corresponding plurality of valves. However, the actuator 100 is not limited to use as a valve actuator.

The actuator 100 is configured such that the operator surface 108 cannot engage with the actuation surfaces 104 of the actuation elements 102a-102c as the operator surface 108 moves along the path in one direction (non-engaging direction), and such that the operator surface 108 can engage with the actuation surfaces 104 of the actuation elements 102a-102c as the operator surface 108 moves along the path in the opposite direction (engaging direction).

Each actuation surface 104 is a ramp as illustrated in FIGS. 2A and 2B. With reference to FIG. 1, as the operator 106 moves from left to right (in the engaging direction), the operator surface 108 eventually engages with a lower end of a ramp. The operator surface 108 is approximately level with the bottom of each ramp. The operator 106 is fixed to the extent that it cannot be moved substantially up or down (i.e.

along the axis along which each actuation element 102a-102c is actuated). Therefore, as the operator 106 continues to move to the right, the respective actuation element 102a-102c with which the operator surface 108 is engaged is forced down and is depressed. Of course, the ramps can be configured such that the actuation elements 102a-102c are forced up instead, if preferred.

When the operator surface 108 reaches the end of the ramp, it passes over the end of the ramp, releasing or disengaging from the respective actuation element 102a-102c. The operator surface 108 may then continue to move in the same (engaging) direction until it engages the next actuation element 102a-102c.

Each actuation element 102a-102c is biased by an actuation element spring element 136 configured to return its respective actuation element 102a-102c to its original (pre-engagement) position after the operator surface 108 disengages the respective actuation element 102a-102c, although this is not essential. Although illustrated as part of the second example actuator 100 discussed below, it can be understood from FIGS. 2A and 6 that for each actuation element 102a-102c, an actuation element spring element 136 is mounted in the actuation element rack 110 between an actuation element pin 134 and the respective actuation element 102a-102c. Each actuation element spring element 136 is configured to be biased against (push) its respective actuation element 102a-102c. Of course, when the ramps are configured such that the actuation elements 102a-102c are forced up when engaged, each actuation element spring element 136 will be configured to pull on its respective actuation element 102a-102c, in order to return each actuation element 102a-102c to its original position when disengaged.

As will be understood, an extent of actuation of each actuation element 102a-102c changes as the operator surface 108 moves along the path and selectively engages with the ramp of each actuation element 102a-102c.

However, each ramp is configured so that the operator surface 108 is able to engage with the ramp when it moves along the path in one direction only (the engaging direction). For example, the ramp may approximate a right-angled triangle, wherein the operator surface 108 is positioned below a top end of each ramp. Therefore, with continued reference to FIG. 1, as the operator 106 moves from right to left (the non-engaging direction), the operator surface 108 cannot enter the ramp and instead contacts a side wall 114 of one of the actuation elements 102a-102c. The side wall 114 is concave, as illustrated in FIG. 2B, to securely trap the operator surface 108 as it travels from right to left and prevent it from slipping onto the ramp of the respective actuation element 102a-102c, although it is not necessary for the side wall 114 to be concave.

Many ramp shapes and configurations may be used, such as a ramp approximating an isosceles triangle, wherein the actuation elements 102a-102c are at first depressed and then released as the operator surface 108 moves across the ramp. In this instance, the operator surface 108 may enter the ramp from either direction.

The ramp may comprise a backstop 132, as discussed below with reference to FIGS. 5A and 5B.

As explained above and with continued reference to the first example actuator 100 of FIG. 1 and actuation element 102a-102c illustrated in FIGS. 2A and 2B, as the operator 106 moves from right to left (in the non-engaging direction), it cannot enter the ramp of an actuation element 102a-102c and instead contacts a side wall 114 of the actuation element 102a-102c. Therefore, in order to allow the operator 106 to continue to move from right to left in order to move to a different actuation element 102a-102c in the non-engaging direction, an actuation element bypass mechanism, illustrated in FIG. 3, is provided.

Figure 3A:
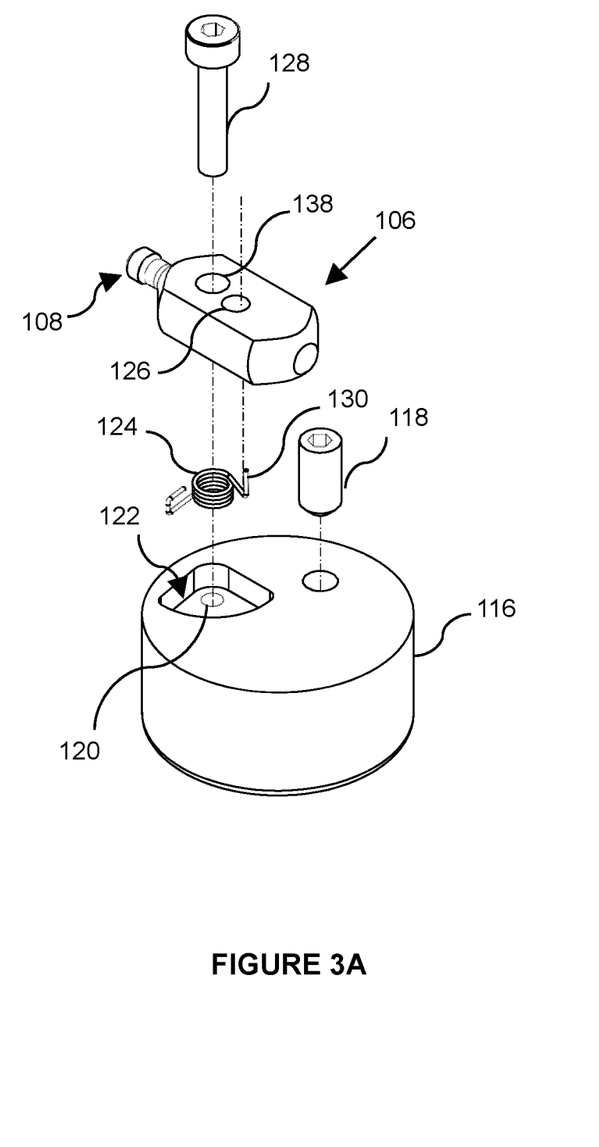
FIGS. 3A to 3C illustrates an operator and operator support.

With reference to FIG. 3A, the operator 106 is connected to an operator support 116. The operator support 116 comprises a stopper pin 118, an operator support pin hole 120 and a spring recess 122 in the surface of the operator support 116 for receiving a torsion spring 124. Spring elements other than a torsion spring, such as a helical spring or any other appropriate spring may be used instead of the torsion spring 124. The operator support pin hole 120 is located in the spring recess 122.

The above-described operator 106 comprises an operator pin hole 138 and an operator-spring pin hole 126.

The operator 106 is connected to the operator support 116 by a bolt 128 passing through the operator pin hole 138 and into the operator support pin hole 120. The operator 106 pivots or rotates about the bolt 128.

When the operator support 116, torsion spring 124, operator 106 and bolt 128 are assembled, a biasing pin 130 (which is part of the torsion spring 124 and can also be considered a right-angled interfacing feature of the torsion spring 124) in the operator-spring pin hole 126 enables the torsion spring 124 to interact with the operator 106 such that the operator 106 is biased towards the stopper pin 118. Thus, in the absence of any external forces, the operator 106 is biased against the stopper pin 118, and, with reference to the configuration of the operator 106, operator support 116 and stopper pin 118 as illustrated in FIG. 3, the operator 106 cannot rotate about the bolt 128 when a force is applied to the operator surface 108 in a leftward direction.

In contrast, when a force is applied to the operator surface 108 in a rightward direction, the torsion spring 124 is compressed and the operator 106 rotates about the bolt 128 in a clockwise direction.

Figure 3B:
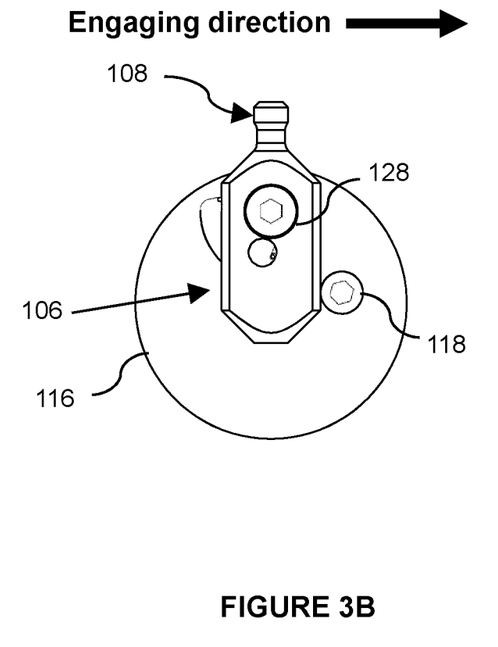
Figure 3C:
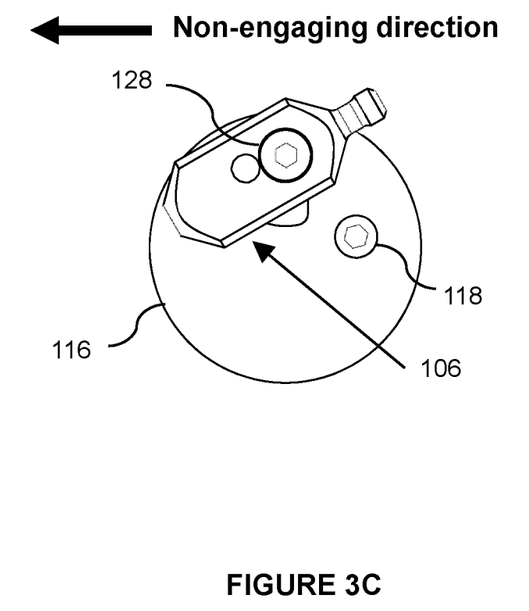

Returning to FIG. 1, and as illustrated in FIGS. 3B and 3C, it can thus be understood that as the operator 106 moves from right to left (in the non-engaging direction), the operator 106 begins to rotate as the operator surface 108 comes into contact with an actuation element 102a-102c. As the operator 106 continues to move from right to left, rotation of the operator 106 continues, and the operator 106 is able to move past the respective actuation element 102a-102c in a non-engaging position (or bypass position). Once the operator has moved past the respective actuation element 102a-102c, the torsion spring 124 returns the operator 106 to its initial position, biased against the stopper pin 118.

Similarly, when the operator support 116 rotates clockwise (engaging direction), as discussed later, the operator 106 is biased against the stopper pin 118. The operator surface 108 is positioned to engage with the ramp surface 104 of the nearest actuation element 102a-102c. When the operator support 116 rotates counter clockwise (non-engaging direction), the operator 106 rotates about the bolt 128 to the non-engaging position and is able to move past the actuation elements 102a-102c.

Of course, the above-described bypass mechanism is not essential. For example, the actuation surface 104 of each actuation element 102a-102c may approximate an isosceles triangle, as described above, such that the operator 106 is able to engage each actuation element 102a-102c irrespective of the direction it is moving in. That is, with this configuration, the operator 106 can always move in either direction and there is no non-engaging direction, although the operator surface 108 must engage all intervening actuation elements 102a-102c when moving from one actuation element 102a-102c to another.

Alternatively, the path along which the operator surface 108 is driveable may be a closed loop, such as an ellipse or circle or any other closed curve, regular or irregular. That is, as the operator surface 108 continues to move in one direction (the engaging direction), it eventually returns to the same position. Means for moving an operator 106 along a closed loop or irregular track are well known to the skilled person.

By virtue of an actuation element pin 134 and actuation element spring element 136 described above, each actuation element 102a-102c is biased to an activated position when not engaged with the operator surface 108, and each actuation element 102a-102c assumes an at least partially deactivated position when the operator surface 108 engages with the respective actuation surface 104 of each actuation element 102a-102c. An activated position means that the actuation element 102a-102c is biased such that it actuates or operates an object, such as a valve of a liquid handling device.

Figure 4:
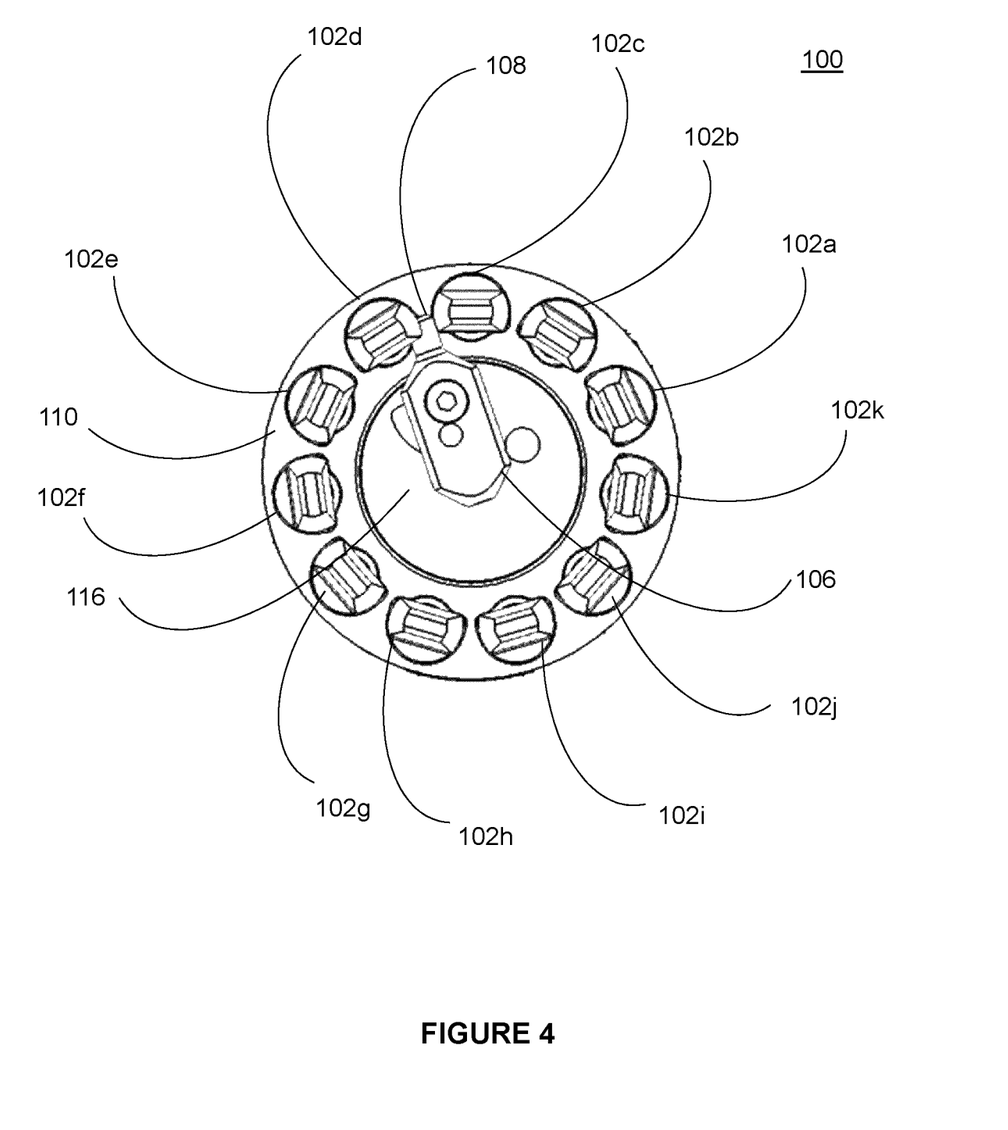
FIG. 4 illustrates an actuator with a circular array of actuation elements.

A second example actuator 100 is illustrated in FIG. 4. The actuator 100 comprises eleven independently operable actuation elements 102a-102k arranged in a circle and mounted in an actuation element rack 110. As such, the path along which the operator surface 108 moves is circular. The second example actuator 100 is similar to the first example actuator 100 unless stated otherwise.

The actuator 100 also comprises an operator 106 with operator surface 108 which may be driven backwards and forwards along the circular path using a motor, or any other suitable means, as would be understood by the skilled person.

The operator support 116 of the actuator 100 is rotatable, and may be connected to a motor or other suitable means to rotate the operator 106 and thus drive the operator surface 108 along the circular path. As such, a central point of the circular path coincides with a rotation axis of the operator support 116.

Figure 5A:
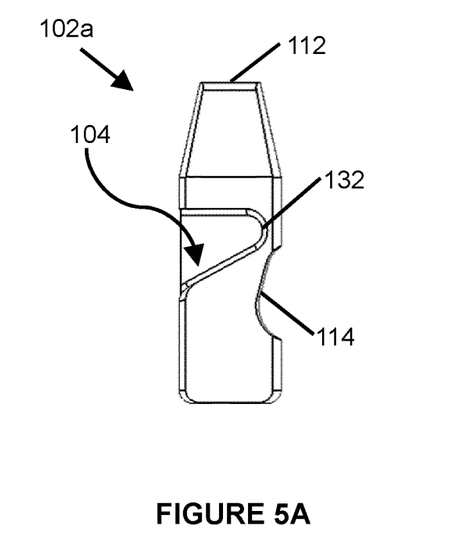
FIGS. 5A and 5B illustrate actuation elements with a backstop.
Figure 5B:
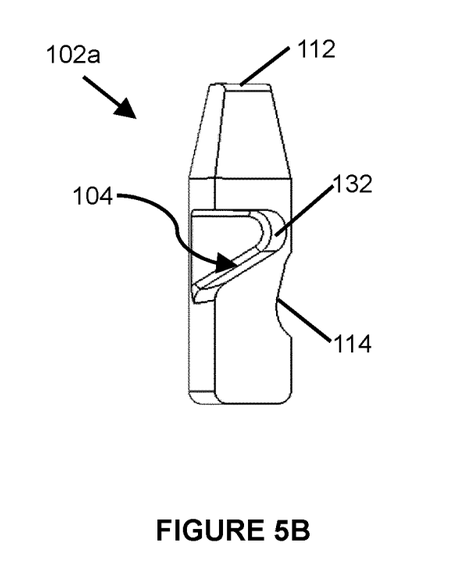

The actuation elements 102a-102k of the actuator 100 are illustrated in detail in FIGS. 5A and 5B. In addition to an actuation surface 104 being configured as a ramp, and a concave side wall 114, each actuation element 102a-102k comprises a backstop 132 configured to prevent the operator surface 108 from disengaging the actuation surface 104. That is, the backstop 132 is configured to prevent the operator surface 108 from disengaging the actuation surface 104 as the operator surface 108 moves in one direction (the engaging direction), but not as it moves in the opposite direction (the non-engaging direction). As such, the backstop 132 may be at or towards a top end of the ramp (i.e. the end opposite the end at which the operator surface 106 is configured to enter the ramp).

Of course, each actuation element 102a-102k may not have a backstop 132, as per the first example actuator 100.

As with the first example actuator 100, as the operator 106 moves in one direction (the engaging direction, which is clockwise in the case of FIG. 4), it engages the actuation surface 104 of one of the actuation elements 102a-102k, and depresses the respective actuation element 102a-102k.

Owing to the presence of the backstop 132, after engaging an actuation surface 104 and continuing to move in the same engaging direction, eventually the actuator 106 contacts the backstop 132 and cannot continue moving in the same direction.

Therefore, the second example actuator 100 comprises the same bypass mechanism described above for the first example actuator 100 and illustrated in FIG. 3. The bypass mechanism allows the operator 106 to move in a direction opposite the direction in which the operator surface 108 is driven to engage one of the actuation elements 102a-102k. That is, the bypass mechanism allows the operator 106 to move in the non-engaging direction.

Of course, if the backstop 132 were not present on each of the actuation elements 102a-102k, a bypass mechanism would not be necessary, and the operator surface 108 could me moved to and engage with any of the actuation elements 102a-102k with only one direction of travel (in the engaging direction), since the path along which the operator surface 108 is driven is a closed loop, as explained above.

Figure 6:
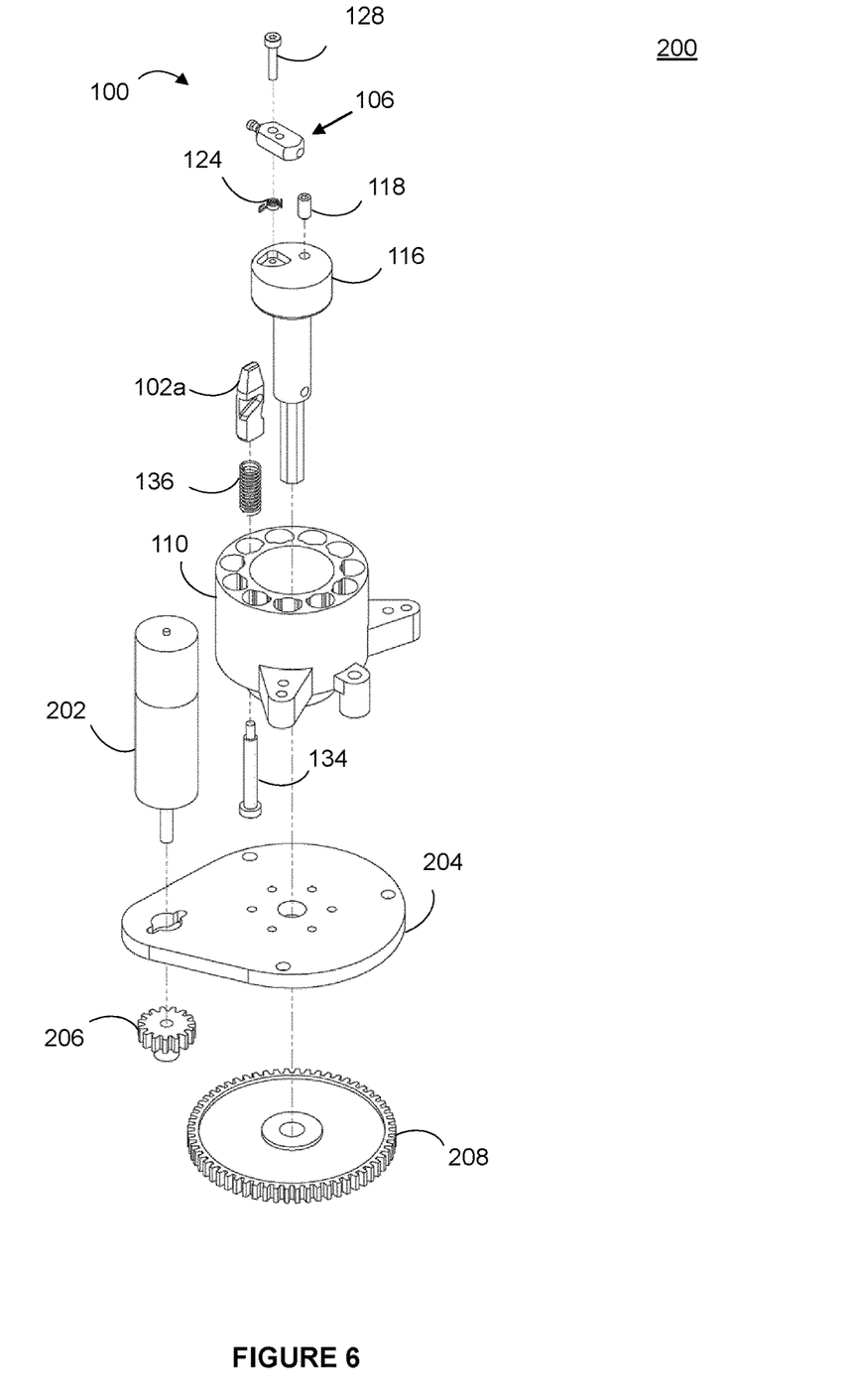
FIG. 6 illustrates an actuator assembly.

In some aspects and with reference to FIG. 6, an actuator assembly 200 comprises an actuator 100 as described above (the second example actuator with a circular arrangement of actuation elements 102a-102k is shown) and a driving means 202 for driving the operator 106 of the actuator 100.

The driving means 202 is a stepped drive motor with more than 100 positions, although any other suitable driving means 202 may be used. The driving means 202 is operable to selectively drive the operator 106 to selectively position the operator surface 108 along the path to selectively actuate one of the actuation elements actuation elements 102a-102k.

The driving means 202 is connected to the operator support 116 of the actuator 100 via an input gear 206 and an output gear 208.

The driving means 202, actuation element rack 110 of the actuator 100, input gear 206 and output gear 208 are mounted to a base plate 204.

As would be understood by the skilled person, the driving means 202 is configured to rotate the input gear 206 and output gear 208 in order to rotate the operator support 116.

Other actuator assemblies 200 are envisaged, such as an actuator assembly 200 comprising the first example actuator 100 with linearly arranged actuation elements 102a-102k. Such an actuator assembly 200 may comprise a driving means 202 configured to drive the operator 106 via a rack-and-pinion. Other arrangements of actuation elements 102a-102k are also envisaged, with suitably configured driving means 202.

Figure 7:
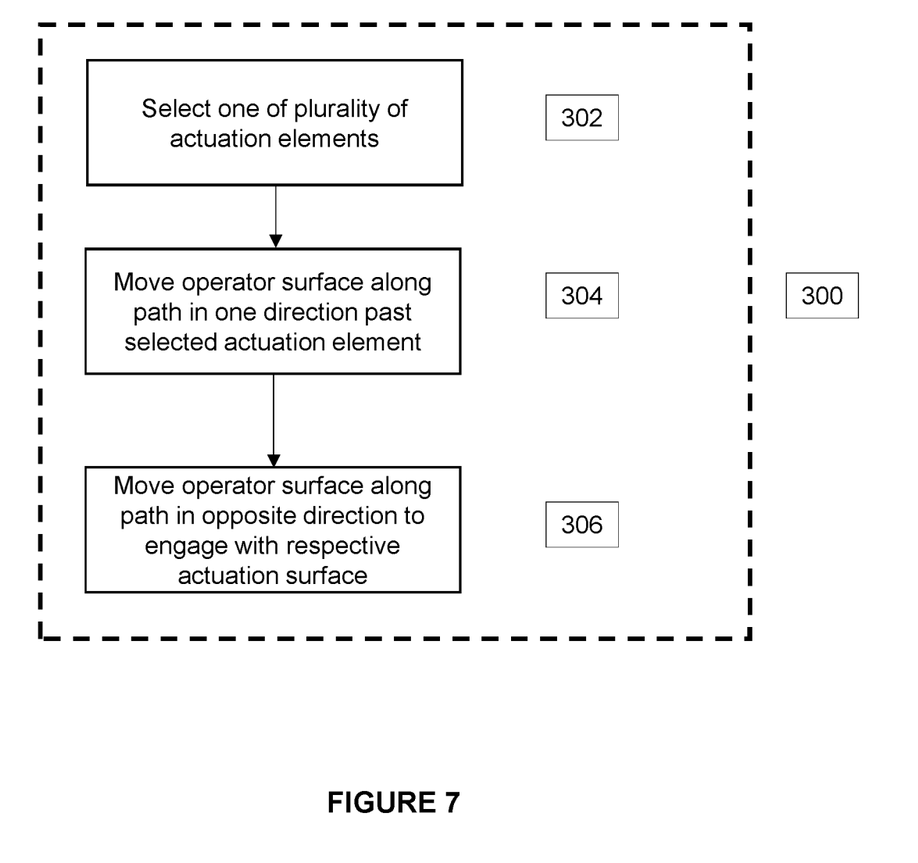
FIG. 7 illustrates a flow diagram for a method of operating an actuator.

In some aspects and with reference to FIG. 7, a method of operating an actuator 100 as described above comprises driving 300 the operator 106 to move the operator surface 108 along the path to selectively engage with the respective actuation surface 104 of one of the actuation elements 102a-102k to actuate the actuation element 102a-102k.

The method may further comprise selecting 302 one of the plurality of actuation elements 102a-102k; moving 304 the operator surface 108 along the path in one direction (a non-engaging direction) past the selected actuation element 102a-102k; and then moving 306 the operator surface 108 along the path in the opposite direction (an engaging direction) to engage with the respective actuation surface 104 of the selected actuation element 102a-102k.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g. for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

Thus, also disclosed is a computer program comprising computer-executable instructions which, when executed by a system 400, cause the system 400 to perform any of the methods described above.

Figure 8:
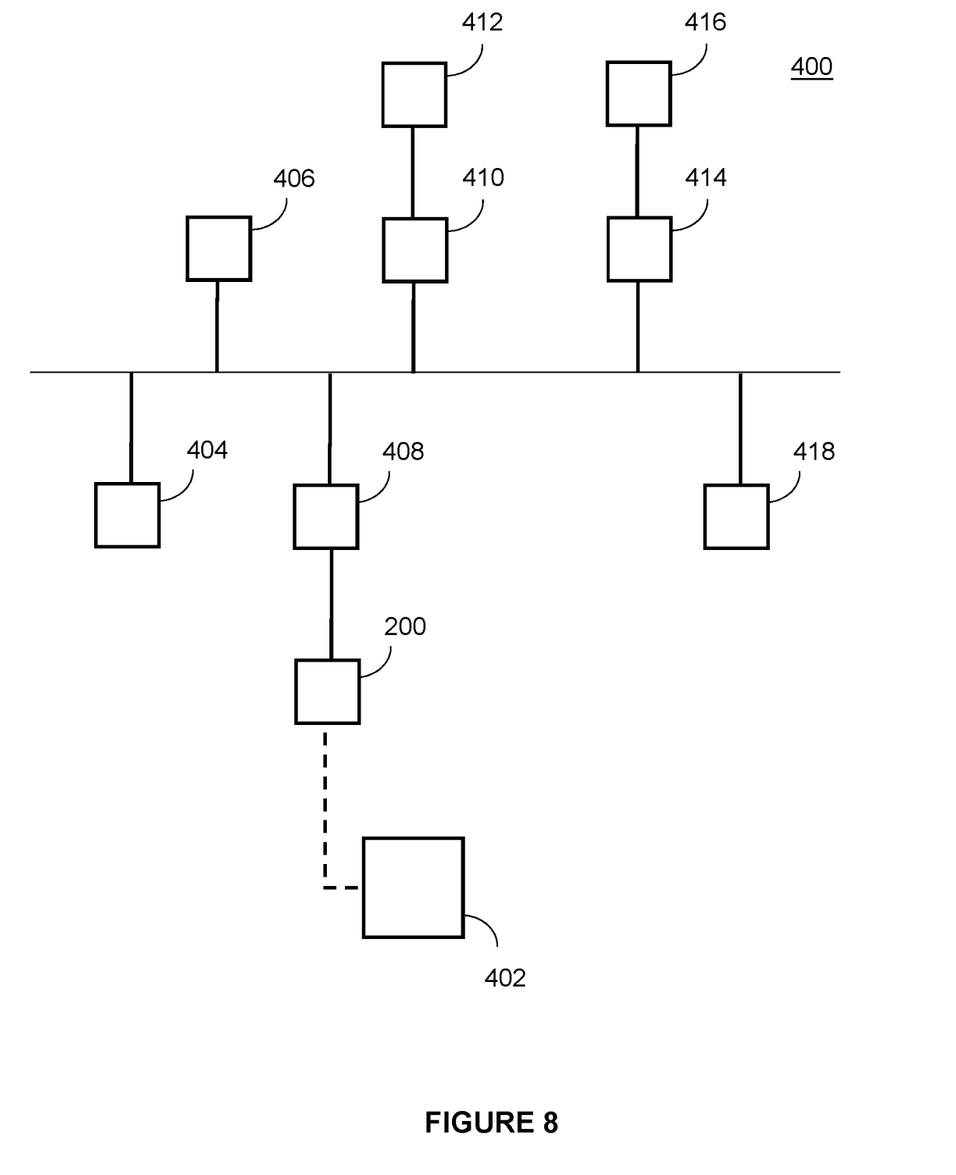
FIG. 8 illustrates a block diagram for a system.

FIG. 8 illustrates a system 400. The system 400 comprises an actuator assembly 200 as described above and a mechanical device 402 configured to be operated by the actuator assembly 200. The system 400 further comprises a central bus structure, processor 404, data processing resources such as memory 406, actuator controller 408, display adapter 410, display device 412, one or more user-input device adapters 414, one or more user-input devices 416, such as a keyboard and/or a mouse, and one or more communications adapters 418.

The mechanical device 402 may, for example, be a liquid handling device comprising a plurality of valves, wherein the actuator assembly 200 is a valve actuator and the actuation elements 102a-102k of the actuator 100 are configured to actuate the plurality of valves.

The processor 404 is configured to execute the computer program which causes the system 400 to perform any of the methods described above. The processor 404 is in communication with memory 406, which is for storing the computer program. The processor 404 and memory 406 are connected to the central bus structure.

The display adapter 410 is connected to the display device 412, the one or more user-input device adapters 414 are connected to the one or more user-input devices 416, and the one or more communications adapters 418 provide connections to other computer systems and networks. The actuator controller 408, display adapter 410, user-input device adapters 414 and communications adapters 418 connect to the central bus structure.

The system 400 may be provided by two or more systems (or subsystems) such as an actuator assembly 200 comprising the actuator 100 and a driving means 202, or a system 400 for controlling the actuator assembly 200 comprising the mechanical device 402, processor 404, memory 406, actuator controller 408, display adapter 410, display device 412, one or more user-input device adapters 414, one or more user-input devices 416, such as a keyboard and/or a mouse, and one or more communications adapters 418. The latter system 400 can be provided without one or more of the mechanical device 402, display adapter 410, display device 412, user-input device adapters 414, user-input devices 416 and communications adapters 418.

Embodiments of the invention shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect.

The invention claimed is:

1. An actuator comprising:
a plurality of independently operable actuation elements, each actuation element having an actuation surface; and
an operator having an operator surface,
wherein the operator is driveable to move the operator surface along a path to selectively engage with the respective actuation surface of each actuation element to actuate the actuation element, and
wherein the actuator is configured such that the operator surface cannot engage with the actuation surfaces of the actuation elements as the operator surface moves along the path in one direction, and such that the operator surface can engage with the actuation surfaces of the actuation elements as the operator surface moves along the path in the opposite direction.

2. An actuator according to claim 1, wherein the actuator is a valve actuator and the actuation elements are for actuating a corresponding plurality of valves.

3. An actuator according to claim 2, wherein the valve actuator is for a system for receiving a liquid handling device comprising the corresponding plurality of valves.

4. An actuator according to claim 1, wherein the path is a closed loop.

5. An actuator according to claim 4, wherein the path is a circle.

6. An actuator according to claim 5, wherein:
the actuator further comprises an operator support for supporting the operator, the operator support comprising a stopper pin;
the operator is configured to rotate about a point on the operator support when the operator surface moves along the path in the one direction and the operator contacts one of the actuation elements, such that the operator passes the respective actuation element without the operator surface engaging the actuation surface of the respective actuation element; and
the stopper pin is configured to prevent rotation of the operator as the operator surface moves along the path in the opposite direction.

7. An actuator according to claim 6, wherein the operator support further comprises a spring element configured to bias the operator against the stopper pin.

8. An actuator according to claim 7, wherein the operator support is configured to rotate, and wherein a central point of the circle of the path coincides with a rotation axis of the operator support.

9. An actuator according to claim 1, wherein the plurality of actuation elements comprises three or more actuation elements.

10. An actuator according to claim 1, wherein the operator is configured to operate only one actuation element of the plurality of actuation elements at any one time.

11. An actuator according to claim 1, wherein the operator is driveable to move the operator surface along the path to selectively engage with the respective actuation surface of each actuation element to actuate the actuation element to a selectively controlled degree.

12. An actuator according to claim 1, wherein each actuation element is biased to an activated position when not engaged with the operator surface, and wherein each actuation element assumes an at least partially deactivated position when the operator surface engages with the respective actuation surface of each actuation element.

13. An actuator according to claim 1, wherein each actuation surface is a ramp, and wherein an extent of actuation of each actuation element changes as the operator surface moves along the path and selectively engages with the ramp of each actuation element.

14. An actuator according to claim 13, wherein each ramp is configured so that the operator surface is able to engage with the ramp when it moves along the path from one direction only.

15. An actuator according to claim 14, wherein each ramp comprises a backstop, and wherein the backstop is configured to prevent the operator surface from disengaging the ramp.

16. An actuator assembly comprising:
   the actuator according to claim 1; and
   a driving means for driving the operator.

17. A method of operating an actuator according to claim 1, the method comprising driving the operator to move the operator surface along the path to selectively engage with the respective actuation surface of one of the actuation elements to actuate the actuation element.

18. A method of operating an actuator according to claim 17, the method comprising:
   selecting one of the plurality of actuation elements;
   moving the operator surface along the path in one direction past the selected actuation element; and
   moving the operator surface along the path in the opposite direction to engage with the respective actuation surface of the selected actuation element.

19. A computer program comprising computer-executable instructions which, when executed by a system, cause the system to perform the method of claim 17.

* * * * *